United States Patent [19]

Das et al.

[11] 4,395,444

[45] Jul. 26, 1983

[54] THERMOSETTING CATIONIC ACRYLIC LATEX COMPOSITIONS CONTAINING BLOCKED ISOCYANATES

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 305,566

[22] Filed: Sep. 25, 1981

[51] Int. Cl.³ .................................................. B05D 3/02
[52] U.S. Cl. ................................... 427/388.4; 428/461; 524/157; 524/158; 524/551; 524/558; 524/560; 524/566; 524/745; 524/816
[58] Field of Search .................... 525/374; 526/225; 524/816, 560, 558, 551, 566, 157, 158, 745; 427/388.4

[56] References Cited

U.S. PATENT DOCUMENTS 3,984,299 10/1976 Jarabek ............................ 523/415
3,984,365 10/1976 Lienert et al. .................... 524/158

FOREIGN PATENT DOCUMENTS 53-150436 3/1978 Japan .................................. 525/374

*Primary Examiner*—Joseph L. Schofer
*Assistant Examiner*—N. Sarofim
*Attorney, Agent, or Firm*—Godfried R. Akorli

[57] ABSTRACT

An improved cationic thermosetting latex, coating compositions prepared therefrom, articles coated therewith, and the process for preparing the same are disclosed. Compositions of the instant latices formulated with isocyanate curing agents display improved cure; the improvement residing in selection of surfactants, with particular reference to their gegen-ions, which are used therein.

7 Claims, No Drawings

THERMOSETTING CATIONIC ACRYLIC LATEX COMPOSITIONS CONTAINING BLOCKED ISOCYANATES

BACKGROUND OF THE INVENTION

1. Field of the Invention:

The present invention relates to thermosetting cationic latices, coating compositions prepared therefrom and a process for providing protective coatings for substrates, using said coating compositions.

2. Brief Description of the Prior Art:

Cationic latices are known in the art and their method of preparation involving free radical emulsion polymerization of monomers in water, in the presence of cationic surfactants, is also known. The free radical emulsion polymerization procedure generally results in high molecular weight polymeric products which are normally in the range of 100,000 to several million. In this molecular weight range, the latices possess good mechanical properties. It has, however, been found that the latices leave something to be desired as to film properties relating to protective durability, i.e., the ability of the coatings to maintain their integrity against chemicals, weathering and the like.

In areas such as paper and textile manufacture where protective durability is not an essential service condition, cationic latices in their thermoplastic form have found a ready application primarily due to their inherent adhesion to anionic substrates. In areas such as protective coatings manufacture, where protective durability, particularly weathering, is an essential service condition, the cationic latices in their thermoplastic form are less desirable. In order to prepare good coatings, particularly protective coatings, with properties of outdoor durability, it is desirable to use thermosetting compositions. Coating compositions comprising thermosetting latices are, moreover, advantaged in that their application avoids problems such as air pollution, fire hazards and other problem which attend solvent-based coating compositions. The art-known thermosetting latices of commercial significance are basically anionic, and not cationic.

In developing the present invention, it has been found that there are a number of attendant problems that might have, in the past, hindered the development of cationic thermosetting latices of commercial significance. In the synthesis of substantially coagulum-free and stable cationic latices, strong acids such as HCl, HBr and the like have been used, to provide surfactant gegen-ions. It is believed that certain acids adversely affect some of the properties of the resultant latices. It has, for example, been found that isocyante curing agents, when formulated with the art-known cationic latices, impart ineffective cure at ordinary cure temperatures.

In order to prepare effective thermosetting cationic latices, particularly those which will be useful as protective coatings especially in industrial applications, the above problems will have to be reduced or prefereably avoided. Unfortunately, the art-known thermosetting cationic latices are, by and large, still attended by the aforesaid problems. Seemingly, the prior art has failed to discover the source of the aforesaid problem and/or to provide solutions therefor.

By the present invention, there is now discovered the source of the problem relating to the inhibition of cure provided by isocyanate curing agents, and the solution therefor. Accordingly, there is now provided a thermosetting cationic latex, and coating compositions prepared therefrom which cure very effectively at ordinary baking temperatures.

SUMMARY OF THE INVENTION

In accordance with the foregoing, the present invention encompasses a stable thermosetting cationic acrylic latex composition, comprising a blocked isocyanate curing agent and a cationic acrylic latex; the cationic acrylic latex is prepared by a process which comprises copolymerizing in an acidic medium, in the presence of a cationic surfactant, ethylenically unsaturated monomers, at least one of which contains an active hydrogen group; the cationic surfactant comprises a gegen-ion derived from an aliphatic or aromatic sulfonic acid selected from the group consisting of methanesulfonic acid, ethanesulfonic acid, propanesulfonic acid, benzenesulfonic acid, toluenesulfonic acid, phenolsulfonic acid and cresolsulfonic acid.

Thermosetting coating compositions prepared from the above-described latices, articles coated therewith, and the process for providing protective coatings for substrates, are also encompassed by this invention.

The thermosetting coating compositions have been found to have good substrate adhesion; more significantly, they cure very effectively. The cured films have been found to be very desirable; they display excellent properties of adhesion, smoothness, gloss retention, non-chalking, and corrosion, chemical and solvent resistance.

In a preferred embodiment, the thermosetting latices comprise amino groups. Coating compositions of the amino group-containing latices have been found to display, in addition to the above, properties of mildew resistance and oxidative stability. In this context, the characterization of the acrylic latex, and the compositions thereof, as "amino group-containing" denotes that the polymer contains an amino group either as an integral part of it, or as otherwise present in its matrix. The former is illustrated by copolymerization of amino group-containing monomers, and the latter by, say, the use of an amino group-containing reagent, such as a surfactant which will co-cure with the polymer.

DETAILED DESCRIPTION OF THE INVENTION

The thermosetting cationic acrylic latex of this invention is prepared by free radical polymerization in an aqueous medium of ethylenically unsaturated monomers in the presence of a cationic surfactant. As is set forth more fully herein, the present invention is characterized by a select group of surfactants which are used during the polymerization of the monomers.

The polymerizable monomers are selected from the group consisting of an active hydrogen group-containing monomer and one or more other monomers different from the above.

The active hydrogen group can be a hydroxyl, amino, amido, aldehyde or thiol group or mixtures thereof. They are incorporated into the polymer, during the preparation thereof, by copolymerizing ethylenically unsaturated monomers containing said active hydrogen groups.

Representative of the active hydrogen group-containing monomers are the hydroxyl group-containing monomers such as hydroxyalkyl acrylates and methacrylates. Preferably, the hydroxyalkyl group contains from about 2 to 4 carbon atoms. Examples thereof are hydroxyethyl acrylate, hydroxyethyl methacrylate, hydroxypropyl acrylate and hydroxypropyl methacrylate.

Examples of the amino group-containing monomer are the same as described hereinafter.

Examples of vinyl monomers containing amido groups are acrylamide, methacrylamide, ethacrylamide, alpha-chloro acrylamide, vinyl acetamide, N-methyl acrylamide, N-ethyl acrylamide and N-methyl methacrylamide.

The vinyl monomers containing the active hydrogens can be used in amounts of 1 to 30, preferably 1 to 10 percent by weight based on total weight of the monomer charge.

Examples of other ethylenically unsaturated monomers which are generally copolymerized with the above monomers are esters of unsaturated organic acids. These monomers can constitute from about 30 to 90, preferably from 40 to 80 percent of the total monomer charge. Representative of said monomers are alkyl acrylates and methacrylates containing from about 1 to 18 carbon atoms in the alkyl group.

The cationic latex can contain a hard polymer segment derived from an alkyl methacrylate containing from 1 to 3 carbon atoms in the alkyl group such as methyl methacrylate and ethyl methacrylate. Also, the cationic latex can contain a soft polymer segment obtained from the use of an alkyl methacrylate containing from 4 to 12 carbon atoms in the alkyl group, for example, butyl methacrylate and hexyl methacrylate, or an alkyl acrylate containing from 1 to 8 carbon atoms in the alkyl group, for example, butyl acrylate and 2-ethylhexyl acrylate. Mixtures of alkyl methacrylates containing from 4 to 12 carbon atoms in the alkyl group and alkyl acrylates containing from 1 to 8 carbon atoms in the alkyl group can also be used.

Another type of ethylenically unsaturated monomer which can be used in preparing the cationic latex constitutes copolymerizable monomeric materials such as styrene, alpha-methyl styrene, alpha-chlorostyrene, allyl chloride and acrylonitrile. This type of unsaturated monomeric materials can constitute about 0 to 60, preferably 0 to 40 percent by weight based on the total weight of the monomer charge.

The cationic latex may optionally contain carboxylic acid moieties which are introduced into the polymer from the use of an alpha, betaethylenically unsaturated carboxylic acid which is copolymerizable with the other monomers. Examples of unsaturated carboxylic acids are acrylic acid and methacrylic acid. Examples of other less preferred unsaturated acids are crotonic acid, maleic acid or its anhydride, fumaric acid or itaconic acid. Usually, when these latter-mentioned acids are used, they are used in combination with acrylic or methacrylic acids. It is, however, preferred that the polymer contain little or no carboxyl groups.

Amino group-containing monomers are particularly useful in the preparation of the preferred embodiments of the invention, with the advantages set forth above. The amino group can be primary, secondary, tertiary or quaternary. Representative of the amino-containing monomers are aminoalkyl acrylates or methacrylates. Preferably, the aminoalkyl group contains from about 1 to 6 carbon atoms in the alkyl radical. Examples thereof are appropriate salts of aminoethyl, aminopropyl and aminohexyl acrylates or methacrylates, N,N-dialkylaminoalkyl acrylates or methacrylates. Also useful are vinyl monocyclic or bicyclic amino compounds including those which have a five or six-membered heterocyclic compound with a nitrogen heteroatom; acrylamideamino modified monomers and quaternary ammonium group-containing monomers.

The amino group-containing monomers can be present for the polymerization in amounts, preferably, from about 0.5 to 10, more preferably from about 1 to 3, and most preferably from about 1.5 to 2.5 percent based on total weight of the monomer charge.

As set forth herein before, the preparation of the acrylic latices of this invention involves the use of surfactants as emulsifiers or stabilizers. It has now been discovered, and this discovery is part of the present invention, that certain surfactants, when used in the preparation of the cationic acrylic latices, can have an adverse effect on the cured thermosetting latices as is manifested in film properties of coatings derived therefrom. Specifically, it has been discovered that when certain surfactants are used in the polymerization, they have a substantial effect on the effectiveness of the cure obtained from isocyanate crosslinkers formulated therewith. It has been found that the art-known and preferred surfactants comprising certain gegen-ions, which will be described herein as cure-inhibiting gegen ions, e.g., $Cl^-$, which is commonly used $Br^-$, $I^-$, $F^-$ and $CH_3OSO_3^-$, adversely affect cure at desired bake temperatures ranging up to 450° F. (232° C.). While not desiring to be bound to any specific theory, it is believed that many of the art-known gegen-ions which are realized from acids such as HCl inhibit the isocyanate-active hydrogen (such as OH) cure mechanism.

To avoid this problem, the thermosetting cationic latex of the present invention, the articles coated therewith, and the process for preparing the same are characterized in that the surfactants employed therein are free of cure-inhibiting gegen-ions.

In accordance with this invention, the surfactants which are useful herein can be selected from the group consisting of aliphatic and aromatic sulfonic acids such as methanesulfonic acid, ethanesulfonic acid, propanesulfonic acid, benzenesulfonic acid, toluenesulfonic acid, phenolsulfonic acid and cresolsulfonic acid. The aliphatic sulfonic acid, wherein the aliphatic moiety is an alkyl group containing from 1 to 4 carbon atoms, is preferred. Methanesulfonic acid is highly preferred herein.

The surfactants can be of an external or internal type, or both. By external surfactants are meant those which do not constitue an integral part of the resulting acrylic latex polymer backbone. In contrast, by internal surfactants are meant those which do constitute an integral part of the resulting acrylic latex polymer backbone; they are realized through a copolymerization of monomers which are capable of salt formation. It is desired to point out that when the internal surfactants are employed, the salt formation can occur before, during or after polymerization of the monomer.

Typically, the amount of surfactant required varies primarily with the concentration of the monomers to be handled and, to an extent, with the choice of surfactant, monomers, and proportions of the monomers. Usually, the amount of external surfactant is between 0 to 10 percent by weight of the mixture of monomers and is preferably 0.1 to 5 percent by weight. If the latex polymer is to contain none or relatively low amounts of the external surfactant, the amount of the polymerizable monomer giving rise to the internal surfactant will have to be increased compensatorily.

The free radical polymerization initiator is a water-soluble type. Examples include peroxides such as cumene hydroperoxide, t-butyl hydroperoxide; and redox catalysts, which are preferred. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

The cationic latex can be prepared by emulsion polymerization techniques well known in the art. Examples of suitable techniques involve the pre-emulsification technique and the seeding technique. In the preemulsification technique, a small amount of water is present in the polymerization vessel together with a polymerization initiator and optionally all or part of the surfactant emulsifying agent. The monomer charge is emulsified in a large amount of water and is continuously added to the reaction vessel under polymerizing conditions. Alternately, the total amount of water may be present in the reaction vessel and the monomer or monomers added in bulk form. If all the surfactant is not present initially in the reaction vessel, it can be added simultaneously with the monomer addition.

In the seeding technique, a small amount of the monomer charge is added to the reaction vessel along with all or part of the polymerization initiator and all or part of the surfactant and polymerized to form a seed latex. After formation of the seed latex, the remaining polymerization ingredients are added in a continuous manner to the reaction vessel under polymerizing conditions to form the final polymer emulsion.

Generally, the solids content of the cationic latex prepared by the above method will be from about 35 to 65 percent and usually within the range of about 40 to 60 percent. The molecular weight of the latex is in the range of about 100,000 to 10 million, on a weight average basis, as determined by gel permeation chromatography. Preferably, the molecular weight is about 250,000 or higher.

The aqueous latex of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The cationic latex prepared by the process described above can be mixed with a minor amount, that is, up to 20 percent by weight based on total latex weight, of thickening agents, stabilizers, anti-foaming agents, preservatives, pigments, pigment extenders and plasticizers, if desired.

The cationic latex of the present invention is made thermosetting in nature by the presence of curing agents, comprising blocked isocyanates. The blocked isocyanates can be an integral part of the polymer or they can be external to the polymer.

The integral isocyanate curing agents can be prepared in the manner illustrated by Example 4 disclosed herein. The external isocyanate curing agents can be the same in nature and method of preparation as in U.S. Pat. No. 3,984,299, column 1, line 57, through column 3, line 5, which is herein incorporated by reference.

The thermosetting compositions prepared as described above can be employed in coating compositions which are either clear or pigmented. The thermosetting cationic latex prepared as described above can be employed in paint compositions. Pigments which may be used can be any of the conventional types, with the proviso that they do not adversely affect the desirable properties of the paint; the settling property of the paint, for example, would have to be taken into account.

The pigment content of the paint is usually expressed as the pigment-to-binder weight ratio. In the practice of the present invention, the pigment-to-binder weight ratios are as high as 2:1, for most pigmented coatings, are within the range of 0.5 to 1:1.

The cationic latex of the present invention, including pigmented latex, is stable, that is, it is non-sedimenting when stored at 10° to 30° C. If any sediment does form, it is the type which can be redispersed with mild agitation.

Coating compositions as described above are particularly useful for coil coating applications. Coil coating involves the application of the coating composition to a continuous strip of a metallic substrate, usually aluminum or steel. The metal is of relatively light gauge and comes to the coating operation in the form of coils from which it is unwound and continuously coated. After coating, the coil passes into a baking or curing oven where it is cured at relatively high temperatures for a relatively short period of time. The coated article is then passed to further operations where it is fabricated into desirable shapes such as for home and industrial siding as well as automotive and appliance parts.

Although particularly useful in coil coating applications, the thermosetting composition of the cationic latex can be applied to any solid substrate such as glass, porcelain or metals other than steel, and aluminum such as copper, brass, and nickel.

Having generally described the features of this invention, the following examples are given to illustrate more fully to those skilled in the art, the practice of this invention without intending any limitations thereby. All parts and percentages are by weight unless otherwise indicated.

EXAMPLES

EXAMPLE 1

The following example shows the preparation of the acrylic latex of this invention. The following were used in the preparation:

| Ingredients | Parts by Weight |
|---|---|
| Reactor Charge | |
| Deionized water | 616.2 |
| Mix A | 109.3 |
| Feed D | 120.8 |
| Ferric chloride (1.0% aqueous) | 0.3 grams |
| Feed A | |
| 10% Feed C | 60 |
| Feed B | |
| Hydrogen peroxide (30% aqueous) | 5.4 |
| Feed C | |
| Butyl acrylate | 282 |
| Methyl methacrylate | 294 |
| Hydroxypropyl methacrylate | 24 |

-continued

| Ingredients | Parts by Weight |
|---|---|
| Feed D | |
| Dimethylaminoethyl methacrylate | 7.5 |
| Methanesulfonic acid (70% aqueous) | 6.6 |
| Deionized water | 106.8 |
| Mix A (10% Aqueous) | |
| Lauryl amine | 4.0 |
| Deionized water | 114.5 |
| Methanesulfonic acid (70% aqueous) | 3.0 |

The reactor charge was heated and agitated under a nitrogen atmosphere to about 56° C., followed by the addition of Feed A. The temperature of the reaction mixture was allowed to rise to 70° C. and then held for 15 minutes at this temperature. Feed B was then added and the addition of Feed C was commenced and continued at the rate of 37.5 ml. per 15 minutes. About 3 minutes from the commencement of the addition of Feed C, the reaction mixture attained a temperature of 76° C., with its color changing to blue indicating the initiation of polymerization. About an hour after the commencement of the addition of Feed C, Feed D was added in three equal portions of 40.6 grams, at one hour intervals, with the temperature maintained at 72° C. With the completion of the addition of Feed C, the reaction mixture was held for another hour within the temperature range of 72°–75° C. Thereafter, the mixture was cooled and then filtered. Resulting was a latex having a pH of 2.9, total resin solids content of 40.1 percent and a Brookfield viscosity of 44.5 centipoises measured with a No. 2 spindle at 20 rpm, measured at 22° C.

EXAMPLE 2

The following example further shows the preparation of the acrylic latices of the present invention.

| Ingredients | Parts by Weight |
|---|---|
| Reactor Charge | |
| Deionized water | 907.2 |
| Feed C | 90.0 |
| Ferric chloride (1.0% aqueous) | 5.6 parts per million |
| 10% Feed B | 148.9 |
| 10% Feed D | 120.8 |
| Feed A | |
| Hydrogen peroxide (30% aqueous) | 12.5 |
| Feed B | |
| Styrene | 960.0 |
| Hydroxypropyl methacrylate | 518.6 |
| Acrylic acid | 15.0 |
| Feed C | |
| Oleyl amine (85% active) | 10.6 |
| Methanesulfonic acid (70% aqueous) | 4.6 |
| Deionized water | 156.8 |
| Feed D | |
| Dimethylaminoethyl methacrylate | 37.5 |
| Methanesulfonic acid (98% aqueous) | 23.0 |
| Deionized water | 1138.9 |

The reactor charge was agitated and heated to a temperature within the range of about 70°–75° C., followed by the addition of Feed A. The reaction mixture was then held at this temperature until it turned blue in color indicating initiation of polymerization. Feeds B and D were then simultaneously added over a period of 3 hours at the rates of 138 cc. and 8.75 ml. per 15 minutes, respectively. At the completion of the addition of Feeds B and D, the reaction mixture was held for 2 hours at 75° C. Thereafter, the mixture was cooled and then filtered. Resulting was a latex having a resin solids content of 40.6 percent, a pH of about 3.0 and a Brookfield viscosity of 60 centipoises measured at 22° C. with a No. 2 spindle at 50 rpm's.

EXAMPLE 3

The following example also shows the preparation of the acrylic latices of the present invention. The following were used in the preparation:

| Ingredients | Parts by Weight |
|---|---|
| Reactor Charge | |
| Deionized water | 1422 |
| Feed C | 90.0 |
| Ferric chloride (1.0% aqueous) | 5.6 parts per million |
| 10% Feed B | 148.9 |
| 10% Feed D | 94 |
| Feed A | |
| Hydrogen peroxide (30% aqueous) | 12.5 |
| Feed B | |
| Methyl methacrylate | 694.5 |
| Butyl acrylate | 694.5 |
| Hydroxypropyl methacrylate | 70.2 |
| Acrylic acid | 30 |
| Feed C | |
| ARMEEN DMCD[1] | 9 |
| Methanesulfonic acid (70% aqueous) | 5 |
| Deionized water | 127.3 |
| Feed D | |
| Dimethylaminoethyl methacrylate | 15 |
| Methanesulfonic acid (70% aqueous) | 13.1 |
| Deionized water | 911.8 |

[1]Dimethyl cocoamine, available from Armak Industrial Chemicals Division.

The reactor charge was agitated and heated to a temperature of about 70° C. followed by the addition of Feed A. The reaction mixture was then held at this temperature until it turned blue in color indicating the initiation of polymerization. Feed B and D were then simultaneously added over a period of 3 hours at the rates of 138 cc. and 70 cc. per 15 minutes, respectively. At the completion of the addition of Feeds B and D, the reaction mixture was held for 2 hours at 75° C. Thereafter, the mixture was cooled and then filtered. Resulting was a latex having a resin solids content of 36.8 percent, a pH of about 2.9 and a Brookfield viscosity of 32 centipoises measured at 22° C. with a No. 1 spindle at 50 rpm's.

EXAMPLE 4

The following example shows the preparation of the acrylic latices of the present invention comprising an internal curing agent comprising a blocked isocyanate group.

| Ingredients | Parts by Weight |
|---|---|
| Reactor Charge | |
| Deionized water | 709.2 |
| Feed C | 8.4 |
| Ferric sulfate (1.0% aqueous) | 0.3 |
| Feed D (10% aqueous) | 120.9 |
| Feed A | |
| Hydrogen peroxide (30% aqueous) | 5.13 |
| Feed B | |
| Methyl methacrylate | 230.6 |
| Butyl acrylate | 221.4 |
| Hydroxypropyl methacrylate | 28.8 |
| Styrene | 63.3 |

-continued

| Ingredients | Parts by Weight |
| --- | --- |
| *{ Isocyanatoethyl methacrylate | 29.1 |
| Styrene | 29.1 |
| 2-ethylhexanol | 25.5 |
| Feed C | |
| ARMEEN DMCD | 2.0 |
| Methanesulfonic acid (70% aqueous) | 1.17 |
| Deionized water | 25.0 |
| Feed D | |
| Dimethylaminoethyl methacrylate | 14.8 |
| Methanesulfonic acid (70% aqueous) | 13.1 |
| Deionized water | 213.7 |

*The isocyanatoethyl methacrylate in the styrene monomer solution was blocked with the 2-ethylhexanol before it was copolymerized.

The reactor charge was agitated and heated to a temperature of about 72° C., followed by the addition of 60 cc. of Feed C, and all of Feed A. The reaction mixture was then held at this temperature until it turned blue in color indicating the initiation of polymerization. Feed B was added over a period of 3 hours at the rate of 45 cc. per 15 minutes. The temperature of the reaction mixture rose to 79° C., was allowed to cool to 75° C., at which temperature 38 cc. of Feed D were added at one-hour intervals, with the temperature maintained within the range of 76°–75° C. At the completion of the addition of Feeds D and B, the reaction mixture was held at 75° C. for 2 hours. Thereafter, the mixture was cooled and then filtered. Resulting was a latex having a resin solids content of 40 percent, a pH of 2.7 and a Brookfield viscosity of 54 centipoises measured at 50 rpm's with a No. 1 spindle, at 22° C.

EXAMPLE 5

This example illustrates the thermosetting cationic latex coating compositions of the present invention, the method of preparing and using the same.

A pigment paste, useful herein, was prepared with the following:

| Ingredients | Parts by Weight |
| --- | --- |
| Acrylic Grind Vehicle[1] | 78.13 |
| Diethylene glycol monobutylether | 53.33 |
| Lactic acid | 17.33 |
| Deionized water | 112.00 |
| DREWMULSE L-475[2] | 5.00 |
| Titanium dioxide | 506.67 |

[1]This is an amine-containing, water-reducible acrylic polymer.
[2]A defoamer, available from The Drew Company.

The preparation entailed grinding the above ingredients, thoroughly, in a Cowles mixer to a Hegman No. 7.5 grind. The resultant paste was used in preparing the coating composition, as follows:

| Ingredients | Parts by Weight |
| --- | --- |
| Pigment Paste from above | 42.67 |
| Diethylene glycol monobutylether | 5.90 |
| A crosslinker[1] | 18.00 |
| Dibutyltin dilaurate | 0.70 |
| Cationic Latex of Example 1 | 55.60 |
| Deionized water | 15.00 |

[1]A triisocyanate curing agent derived from isophorone diisocyanate, blocked with dibutylamine and dimethylethanolamine.

The preparation was as follows: The grind paste, the diethylene glycol monobutylether and the crosslinker were blended well and then added to the latex in the deionized water, under agitation, until all the ingredients were thoroughly mixed.

The above composition was applied on panels of primed aluminum substrate (Alcoa Bonderite 721) by a draw-down method. The coated panels were baked for 50 seconds at ordinary baking temperatures as reported below (the bake time is reported parenthetically).

The baked films were then subjected to a solvent resistance test using methyl ethyl ketone double-rubs, so as to determine cure response, which is reported below.

The baked films obtained at 420° F. (42 seconds), 435° F. (50 seconds) and 450° F. (55 seconds) were removed by 4, 48 and 84 double-rubs, respectively.

COMPARATIVE EXAMPLE

This example shows cure-inhibition which results when HCl-derived surfactants are used in preparing thermosetting cationic latices and compositions thereof.

Illustrative is a latex prepared as follows:

| Ingredients | Parts by Weight |
| --- | --- |
| Reactor Charge* | |
| Deionized water | 898.3 |
| Feed X | 7.0 |
| Feed D | 9.0 |
| Ferric chloride (1.0% aqueous) | 5.6 parts per million |
| Feed A | |
| 10% Feed C | 69.9 |
| Feed B | |
| Hydrogen peroxide solution (30% aqueous) | 5.4 |
| Feed C | |
| Butyl acrylate | 328.5 |
| Methyl methacrylate | 342.5 |
| Hydroxypropyl acrylate | 28.0 |
| Feed D | |
| 2-aminoethyl methacrylate.HCl | 9.0 |
| Deionized water | 85.4 |
| Feed X | |
| Lauryl amine | 5.0 |
| Deionized water | 50.6 |
| HCl (37% aqueous) | 2.6 |

*The pH of the charge was lowered from a pH of 6.2 to 5.1 by adding 17 drops of acetic acid.

The reactor charge was heated and agitated under a nitrogen atmosphere to about 70° C. and held for 15 minutes at this temperature. At 72° C., Feed B was added and the addition of Feed C was commenced and continued over four hours, at a constant rate. About 5 minutes from the commencement of the addition of Feed C, the reaction mixture attained a blue color, indicating the initiation of polymerization. About an hour after the commencement of the addition of Feed C, Feed D was added in three equal portions, at one hour intervals, with the temperature maintained over the range of 70°–75° C. With the completion of the addition of Feed C and Feed D, the reaction mixture was held for one hour at a temperature of 73° C. Thereafter, the mixture was cooled, and then filtered. Resulting was an acrylic latex having a pH of 3.4 and a total resin solids content of 40 percent.

A coating composition of the above latex was prepared in the same manner as in Example 5, using the following:

| Ingredients | Parts by Weight |
| --- | --- |
| The Grind Paste of Example 5 | 42.67 |
| Diethylene glycol monobutylether | 5.90 |

| Ingredients | Parts by Weight |
| --- | --- |
| The crosslinker of Example 5 | 18.00 |
| Dibutyltin dilaurate | 0.70 |
| The latex of the above | 55.74 |
| Deionized water | 13.0 |

The above composition was applied on panels of primed aluminum substrates (Alcoa Bonderite 721) by a draw-down method. The coated panels were then baked at ordinary bake temperatures, as reported below (the bake time is reported parenthetically).

The baked films were then subjected to a solvent resistance test, using methyl ethyl ketone double-rubs so as to determine cure response which is reported below.

The baked films obtained at 420° F. (42 seconds), 435° F. (50 seconds) and 450° F. (55 seconds) were removed by 2, 3 and 5 methyl ethyl ketone double-rubs.

From the above data, it is seen that coating compositions comprising cure-inhibiting moieties cause cure-inhibition.

We claim:

1. A stable thermosetting cationic acrylic latex composition, comprising a blocked isocyanate curing agent and a cationic acrylic latex; the cationic acrylic latex is prepared by a process which comprises copolymerizing in an acidic medium, in the presence of a cationic surfactant, ethylenically unsaturated monomers, at least one of which contains an active hydrogen group; the cationic surfactant comprises a gegen-ion derived from an aliphatic or aromatic sulfonic acid selected from the group consisting of methanesulfonic acid, ethanesulfonic acid, propanesulfonic acid, benzenesulfonic acid, toluenesulfonic acid, phenolsulfonic acid and cresolsulfonic acid.

2. A thermosetting latex of claim 1, wherein the acid is an aliphatic sulfonic acid wherein the aliphatic moiety is a lower alkyl group containing from 1 to 4 carbon atoms.

3. A thermosetting latex of claim 2, wherein the acid is methanesulfonic acid.

4. A thermosetting latex of claim 1, wherein the latex contains an amino group.

5. A thermosetting latex of claim 4, wherein the amino group is derived from an ethylenically unsaturated monomer which contains an amino group.

6. A coating composition comprising the acrylic latex composition as recited in claim 5.

7. A process for providing a protective coating for a substrate, said process comprising:
   (i) applying a coating composition as set forth in claim 6 to the surface of the substrate; and
   (ii) heating the coated substrate at a temperature sufficient to effect cure.

* * * * *